UNITED STATES PATENT OFFICE.

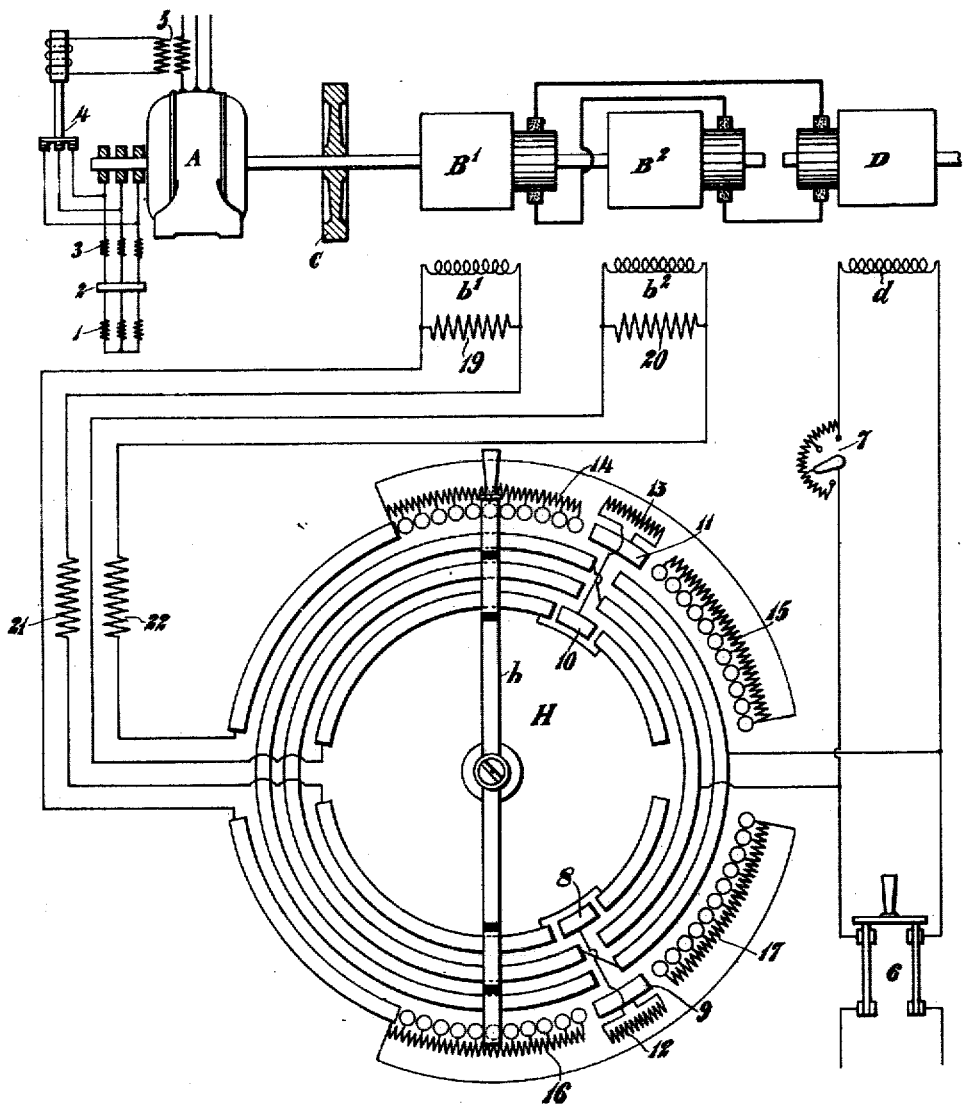

WILLIAM H. POWELL, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

SYSTEM OF MOTOR CONTROL.

No. 865,817.  Specification of Letters Patent.  Patented Sept. 10, 1907.

Application filed December 19, 1906. Serial No. 348,503.

*To all whom it may concern:*

Be it known that I, WILLIAM H. POWELL, a citizen of the United States, residing at Norwood, in the county of Hamilton and State of Ohio, have invented certain new and useful Improvements in Systems of Motor Control, of which the following is a full, clear, and exact specification.

My invention relates to motor control systems and particularly to control systems for mill and hoisting motors.

In rolling mills and in hoisting machinery, it is necessary that the moving parts be quickly and often reversed.

It is the object of my invention to provide a system in which this can be readily accomplished and in which the speed of the moving parts may be varied within wide limits.

With these objects in view my invention in one of its aspects comprises the method of controlling the speed and direction of an electric motor which consists in supplying its armature from two sources of current in series, said sources being normally approximately equal and opposite, and inversely varying the electromotive forces of said two sources of current.

In another aspect my invention comprises the method of reversing an electric motor, which consists in supplying its armature from two assisting sources of current in series, then diminishing reversing and increasing the electromotive force of one of said sources until it is substantially equal and opposite to that of the other source and then diminishing, reversing and increasing the electromotive force of the other source.

From another point of view my invention consists of a motor control system comprising a motor, two sources of current connected in series for supplying the motor armature, and means for varying and reversing the electromotive force of each of said sources of current.

In still another aspect my invention consists of a system of motor control comprising a motor, two generators connected in series for supplying the armature of said motor, and means for inversely varying the field strengths of said generators and for reversing the field which is weakened.

In still a more specific aspect my invention consists of a system of motor control comprising a source of current, a motor supplied thereby, a fly-wheel mechanically connected to said motor, two generators driven by said motor and connected in series to supply a second motor, and means for inversely varying the field strengths of said generators and for reversing the field of either of them.

Other features of my invention will appear from the following description and accompanying drawing and will be particularly pointed out in the claims.

The single figure of the drawing shows diagrammatically one embodiment of my invention.

In this figure A is an electric motor of the three-phase induction type, though obviously other forms of motors could be used instead. In the rotor circuit of this motor is a starting resistance 1 adjustable by means of a short-circuiting bar 2, and a regulating resistance 3 arranged to be cut in and out by a solenoid switch 4, which in turn is responsive to the current strength in the primary circuit of the motor, as through a series transformer 5. Other means for varying the speed of the motor A may be used if desired. Two generator armatures $B'$ and $B^2$ are driven by the motor A, being preferably directly connected thereto, and on the common shaft of the motor A and generators $B'$ and $B^2$ is a heavy fly-wheel C. The two generator armatures are connected in series and supply current to the armature D of the working motor. The electromotive force impressed on the armature D is the algebraic sum of the electromotive forces of the two generator armatures $B'$ and $B^2$. The motor D may be used to drive any desired machinery.

The field winding $b'$ and $b^2$ of the generators and $d$ of the working motor are supplied from any direct current source through a switch 6. The motor field coil $d$ may be adjusted by a rheostat 7. The two field coils of the generators are controlled by a single controller H, which is arranged in different parts of its movement to inversely vary the resistances in circuit respectively with these two field coils, to reverse the current in either field coil after the current in that field coil has been reduced to a predetermined value, and to vary the resistance in circuit with either one of said field coils alone. The arm or handle $h$ of this controller is divided into several electrically distinct parts. There are two sets of variable resistances, one set of which, resistances 14 and 15, are for the field circuit $b'$, and the other set, 16 and 17, for the field circuit $b^2$. The connections of these various resistances are clearly shown in the drawing.

If desired instead of having the resistances 14 and 15 separate, the contacts of one may be connected to the corresponding contacts of the other, one of these resistances being omitted. A similar cross connection may be applied to the contacts of resistances 16 and 17.

The controller H is arranged so that when its arm $h$ is in the vertical position as shown, the field coils $b'$ and $b^2$ are oppositely and substantially equally excited, so that the electromotive forces of the generators $B'$ and $B^2$ substantially balance each other. At such time no electromotive force is impressed on the armature of motor D and said motor is at a stand-still. When the arm $h$ moves to one side of the vertical, the speed of the motor D in one direction is controlled, and when said arm is moved on the other side of the vertical, the speed of said motor in the other direction is controlled.

Between the segments 8 and 9, and 10 and 11, of the controller are arranged resistances 12 and 13 respectively, to take up the field discharge as the circuits through the coils $b'$ and $b^2$ are respectively broken. The resistances 12 and 13 are aided in this by high resistances 19 and 20 respectively permanently connected across the coils $b'$ and $b^2$ respectively.

Non-inductive resistances 21 and 22 are connected in series respectively with the coils $b'$ and $b^2$. These resistances have ohmic values several times as great as those of the field coils with which they are respectively in series, and their purpose is to diminish the time constant of the field magnets $b'$ and $b^2$; for the time constant of a circuit is a function of its inductance divided by its resistance. Therefore by increasing the resistance of the field circuit without increasing its inductance, the current strength being kept the same, the time constant of the field magnet is reduced. By this means quick variations in speed of the motor D may be more readily obtained.

The operation of the system is as follows:—The primary circuit of motor A is closed, and the motor is started by moving the bar 2 to cut out the starting resistance 1. The switch 4 is held open by its solenoid at this time because of the heavy current required for starting the motor. If desired other means may be used to insure the open condition of this switch during starting. After the motor has gained sufficient speed and the starting resistance has been cut out, the solenoid switch 4 is allowed to close to cut out resistance 3 because of the decrease in the primary current of motor A. The fly-wheel C and generator armatures $B'$ and $B^2$ are started with the motor A, and the fly-wheel stores mechanical energy by its rotation. During this starting the arm $h$ is preferably in its vertical or "off" position. The switch 6 now being closed, the field coils $b'$, $b^2$ and $d$ are energized, the two generator field coils being oppositely and substantially equally excited. The electromotive forces of generators $B'$ and $B^2$ counteract each other and no current flows through the armature D of the working motor. The arm $h$ is now gradually moved from the vertical toward the horizontal in the proper direction to give the motor D the desired direction of rotation. As this arm moves, say counter-clockwise, it first inversely varies the resistances 14 and 16, thus weakening the field magnet $b'$ and strengthening the field magnet $b^2$. As the result of this, the electromotive force of $B^2$ exceeds that of $B'$, and the difference between, or algebraic sum of, these electromotive forces is impressed on the motor armature D. As the arm $h$ continues to move, the resistance 14 is completely cut out raising the electromotive force of $B^2$ to its maximum, while the resistance 16 is entirely cut in and the circuit of field coil $b'$ then broken. The field discharge due to this breaking is taken by the resistance 12 assisted by the resistance 19. The electromotive force of the generator $B^2$ is now impressed upon the armature D. Farther movement of the arm $h$ completes the circuit of field coil $b'$ through the entire resistance 17, but the current in this field coil is now the reverse of what it was previously. If the arm is moved still farther to the left, the resistance 17 is gradually cut out of circuit, thus increasing the electromotive force of the generator $B'$. During this latter part of the movement, the generators $B'$ and $B^2$ assist each other, the sum of their electromotive forces being impressed upon the motor armature D. The speed which the motor D acquires depends upon the extent of movement of the arm $h$, full speed being reached when the resistance 17 has been entirely cut out.

If the load is heavy, the working motor requires more power for its starting than the motor A can furnish. The current rising in the primary of the transformer 5 by reason of this heavy load, the switch 4 is opened, thus inserting resistance 3 into the rotor circuit of motor A. This increases the slip of motor A and permits said motor to slow down, thus allowing the fly-wheel C to give up some of the mechanical energy it has stored, which energy helps the motor A to drive the generators $B'$ and $B^2$ to supply electrical energy at the rate demanded by the motor D to drive its load.

As the arm $h$ is moved backward toward the vertical, the field $b'$ is weakened, then reversed, and finally strengthened to about half strength, while the field $b^2$ is weakened to about half strength. All of this causes the algebraic sum of the electromotive forces of the two generator armatures to be diminished, thus decreasing the electromotive force impressed on the armature of the motor D, causing the latter to act as a generator to supply current to the armatures $B'$ and $B^2$ which now serve as motor armatures to help restore energy to the fly-wheel C. There is a powerful braking effect upon the working motor due to its acting as a generator. The diminished current in the primary of transformer 5 also causes the solenoid switch 4 to close, thereby increasing the speed of motor A so that it may also supply energy to the fly-wheel C. The fly-wheel thus stores up any excess of energy supplied when the rate of such supply exceeds the rate at which energy is demanded by the working motor, and gives up said stored energy whenever the rate of energy demanded is greater than the rate of energy supplied. When the arm $h$ is moved in the other direction from the vertical the above cycle is repeated save that the effects on the generators $B'$ and $B^2$ are interchanged.

Whenever the arm $h$ interrupts the field circuits of the generators, the resistance 12 or 13 as the case may be is connected in circuit to take the field discharge, the resistance 19 or 20 assisting in this.

When I use the term "inversely" in this description and in the claims, I do not wish to limit myself to exact "inverse proportion", but intend the term to include any increase in one and decrease in the other of the two things specified.

I have described my invention in what I now consider to be its preferred form, but in the claims I aim to cover all those obvious modifications which readily occur to one skilled in the art.

Having thus described my invention, what I claim as new and desire to secure by Letters Patent is:—

1. The method of controlling the speed and direction of an electric motor, which consists in supplying its armature from two sources of current in series, said sources being normally approximately equal and opposite, and inversely varying the electromotive forces of said two sources of current.

2. The method of controlling the speed of an electric motor, which consists in supplying it from two sources of current in series, and dissimilarly varying the electromotive forces of both of said sources.

3. The method of controlling the direction of rotation of an electric motor, which consists in supplying its armature from two opposing sources of current in series, and varying the relation between the electromotive forces of said sources so that either of them may predominate.

4. The method of reversing an electric motor, which consists in supplying its armature from two assisting sources of current in series, then diminishing, reversing and increasing the electromotive force of one of said sources, and then diminishing, reversing and increasing the electromotive force of the other source.

5. The method of reversing an electric motor, which consists in supplying its armature from two unequal opposing sources of current in series, and then varying the relation between the electromotive forces of said two sources until the inequality is reversed.

6. The method of controlling an electric motor, consisting in rotating a plurality of generator armatures in separate magnetic fields, impressing the algebraic sum of the electro-motive forces of said generator armatures on the armature of the motor, and varying all of the magnetic fields so that at times said algebraic sum is less than one of its components.

7. The method of controlling an electric motor, consisting in rotating a plurality of generator armatures in separate magnetic fields, impressing the algebraic sum of the electro-motive forces of said generators on the armature of the motor, and inversely varying two of said generator fields.

8. The method of controlling an electric motor, consisting in rotating a plurality of generator armatures in separate magnetic fields, impressing the algebraic sum of the electro-motive forces of said generators on the armature of the motor, and differently varying the fields of said generators.

9. The method of controlling an electric motor, consisting in rotating a plurality of generator armatures in separate magnetic fields, impressing the algebraic sum of the electro-motive forces of said generator armatures upon the armature of the motor, and varying said algebraic sum from a maximum in one direction to a maximum in the other direction by successively reversing the magnetic fields of the various generator armatures.

10. The method of operating an electric motor at variable speed and load which consists in supplying mechanical energy, converting it into electrical energy at a plurality of separate electro-motive forces, impressing the algebraic sum of said electromotive forces on the armature of the motor, and individually varying said component electro-motive forces.

11. The method of operating an electric motor at variable speed and load which consists in supplying mechanical energy, converting it into electrical energy at a plurality of separate electro-motive forces, impressing the algebraic sum of said electro-motive forces on the armature of the motor, individually varying said component electromotive forces, storing any excess of mechanical energy supplied when its rate of supply exceeds the rate at which energy is demanded by the load, and supplying said stored energy to the motor as electrical energy when energy is demanded by the load at a rate which exceeds the rate at which the mechanical energy is supplied.

12. A system of distribution, comprising a plurality of dynamo-electric generators driven by a source of substantially constant power, means for inversely varying the electro-motive forces of two of said generators, and means for mechanically storing any excess of energy supplied by the driving source and supplying said stored energy to help drive the generators whenever required.

13. A system of motor control, comprising a plurality of dynamo-electric generators, a motor supplied thereby, means for differently varying the electro-motive forces of said generators, means for storing any excess of mechanical energy supplied to the generators when its rate of supply exceeds the power demanded by the motor at that time, and means for causing said stored energy to be supplied to the motor whenever the power demanded by the motor is above that normally supplied.

14. A system of motor control, comprising a motor, two sources of current connected in series for supplying the motor armature, and means for varying and reversing the electromotive force of each of said sources of current.

15. A motor control system comprising two dynamo-electric generators, a motor whose armature has impressed thereon the algebraic sum of the electromotive forces of said generators, and means for inversely varying said component electro-motive forces.

16. A motor control system comprising two dynamo-electric generators, a motor the armature of which is supplied by said generators in series, and means for differently varying the field strengths of said generators.

17. A system of motor control, comprising an electric motor, a plurality of sources of current connected in series and supplying the motor armature, and means for successively diminishing to zero and increasing in the reverse direction the electromotive forces of said sources of current.

18. A motor control system, comprising a source of mechanical power, a plurality of generators driven thereby, said generators being connected in series, a motor supplied by said generators, means for differently varying the electro-motive forces of said generators, means for storing any excess of mechanical energy supplied by said source when its rate of supply exceeds the rate at which energy is demanded by the motor load, and means for causing said stored energy to be supplied to the motor as electrical energy when energy is demanded by the motor load at a rate which exceeds the rate at which mechanical energy is supplied by the source.

19. In combination, a source of power, a plurality of generators driven thereby and connected in series to supply a motor, means for differently varying the field strengths of said generators, a fly-wheel mechanically connected to said generators, and means for causing the fly-wheel to give up its energy when the load on the motor rises above the normal.

20. In combination, a source of power, two generators driven thereby, a motor supplied by said generators in series, means for inversely varying the resistances of the field circuits of said generators, a fly-wheel mechanically connected to said generators, and means for allowing said fly-wheel to give up its energy when the motor load rises above normal.

21. A system of motor control, comprising a motor, a plurality of generators supplying said motor, a fly-wheel mechanically connected to said generators, and means for successively reversing the fields of said generators.

22. A system of motor control, comprising a motor, two generators connected in series for supplying the armature of said motor, and means for inversely varying the field strengths of said generators and for reversing the field which is weakened.

23. In a system of distribution, a translating device, a plurality of sources of current connected in series for supplying said translating device, and means for successively reversing the electro-motive forces of said sources of current.

24. In a system of distribution, a translating device, a plurality of generators connected in series and supplying said translating device, and means for varying the field strengths of said generators so that the generators oppose each other, or assist each other in either direction.

25. A system of motor control, comprising an induction motor, two generators driven thereby, a fly-wheel mechanically connected to said induction motor, a working motor whose armature is supplied by said two generators connected in series, and unitary means for varying the field strengths of all of said generators.

26. A system of distribution, comprising a translating device, a plurality of generators connected in series and supplying said translating device, and a unitary means for varying and reversing the fields of all of said generators.

27. A system of distribution, comprising a translating device, a plurality of generators connected in series and supplying said translating device, and a unitary means for varying the fields of all of said generators and for reversing said fields at different points in its movement.

28. A system of motor control, comprising a source of current, a motor supplied thereby, a fly-wheel mechanically connected to said motor, two generators driven by said motor and connected in series to supply a second motor, and means for inversely varying the field strengths of said generators and for reversing the field of either of them.

29. A system of motor control, comprising a plurality of generators connected in series and supplying a motor, means for varying the field strengths of said generators, and resistances permanently in said respective generator field circuits.

30. A system of motor control, comprising a motor supplied by a plurality of generators connected in series, resistances in the field circuit of each of said generators, means for varying said resistances and for reversing the current in said respective generator field circuits after their associated resistances have been fully cut in, and a high resistance permanently connected across the field terminals of each generator.

31. A system of motor control, comprising a plurality of generators connected in series and supplying a motor, means for reversing the field magnetism of said generators, and a high resistance permanently connected across the field terminals of each generator.

32. A system of motor control, comprising a source of current supply, a motor supplied thereby, a plurality of generators driven by said motor, a fly-wheel mechanically connected to said motor, a second motor the armature of which is supplied by said generators jointly, and means for permitting the first motor to slow down upon an increase in the load on the second motor.

33. A system of motor control, comprising a source of current supply, a motor supplied thereby, a plurality of generators driven by said motor, a fly-wheel mechanically connected to said generators, a second motor the armature of which is supplied by said generators in series, and means for causing said first motor to increase in speed upon decrease in load on the second motor.

In testimony whereof I affix my signature, in the presence of two witnesses.

WILLIAM H. POWELL.

Witnesses:
GEO. B. SCHLEY,
FRED J. KINSEY.